United States Patent Office 2,868,054
Patented Jan. 13, 1959

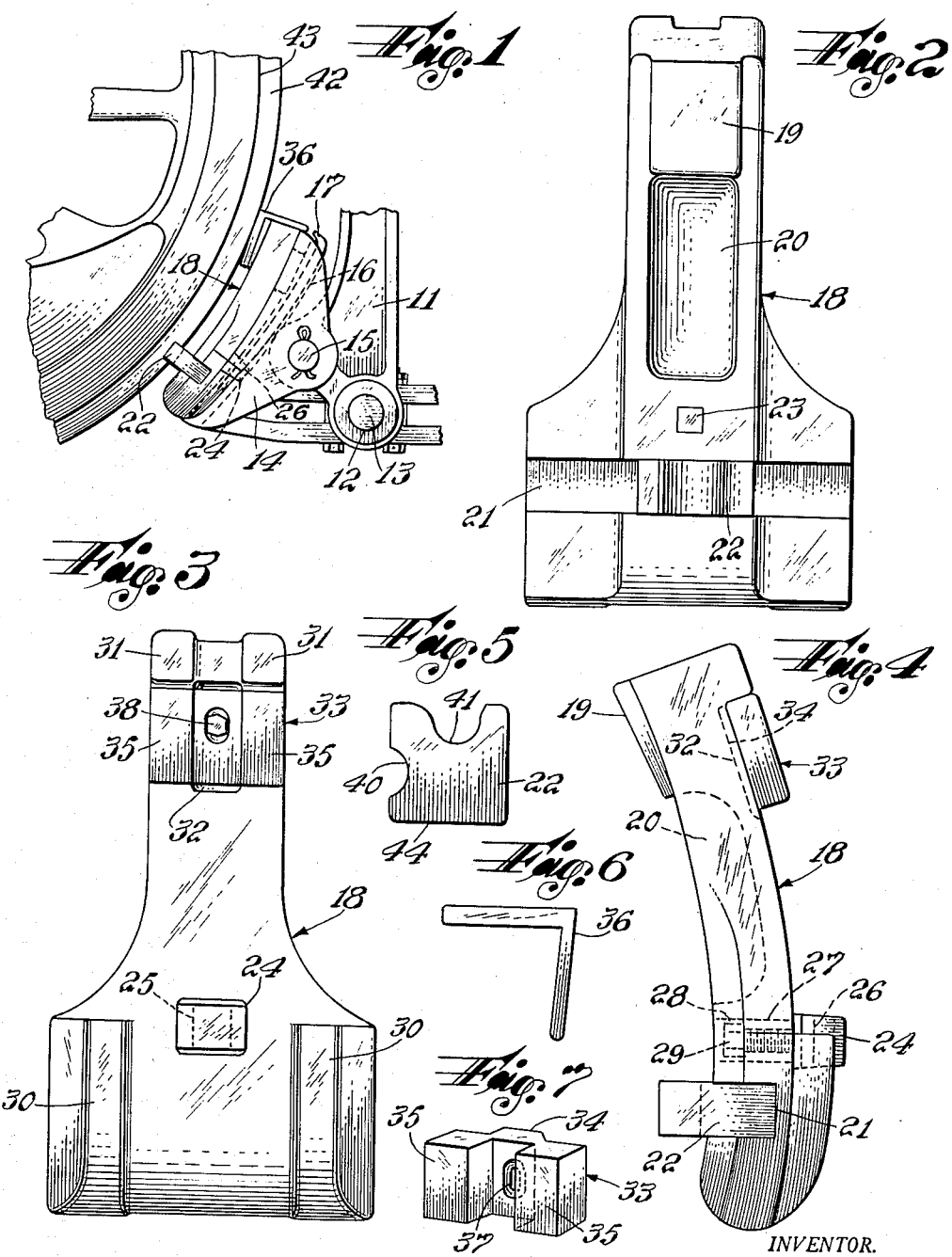

2,868,054

TREAD AND FLANGE REDUCER

John L. McQuillen, Madison, N. J.

Application February 28, 1956, Serial No. 568,390

5 Claims. (Cl. 82—36)

My invention relates generally to an apparatus for machining the flanges and treads on the wheels of railroad locomotives and similar rolling stock, and specifically to an atachment for the brake mechanism of such locomotives, which attachment will machine the flange and restore it to proper size and shape with respect to the tread of the tire and as well to modify inequalities in the surface of the tread.

The tires of locomotive wheels wear away with use and the flange wears to a much lesser degree. An excessively high flange makes for unsafe operation. The flange may be reduced by removing the wheel and machining the flange to proper shape on a lathe. An alternative method is the removal of the brake head and the substitution of a wheel-machining apparatus whereby a tool is applied to the flange. As the locomotive moves under its own power, the flange is reduced.

The removal of the wheel for the purpose of reducing the flange is a costly and time-consuming operation which must be achieved in a locomotive repair shop. The removal of the brake head and the substitution of a wheel-machining apparatus is also a costly and time-consuming operation which most conveniently can only be done in a locomotive repair shop.

By the present invention, instead of removing the brake head, only the brake shoe is removed from the head and a tool holder is supplied instead and attached to the brake head. A substantial economy of time and labor as well as convenience is thereby effected.

It is, therefore, among the objects of my invention to provide a tread and flange reducer which may be substituted for a locomotive brake shoe without the removal of the brake head.

It is a further object of my invention to provide a flange reducer which may be attached to a brake head merely through the use of a brake shoe key.

It is yet a further object of my invention to provide a flange reducer which may be quickly and easily applied with a consequent reduction in time, labor and expense as well as a substantial increase in convenience and speed.

Another object is to supply a tread and flange reducer universally adaptable to any locomotive brake head.

Among the further objects of my invention is to supply a flange reducer which is relatively inexpensive, simple to operate, and durable.

These objects and advantages, as well as other objects and advantages, may be achieved by the device illustrated in the drawings in which, Figure 1 is a side elevational view showing a drive wheel of a locomotive with my tread and flange reducer attached to the brake head and applied to the flange;

Figure 2 is a front elevational view of my tread and flange reducer with the tool in position;

Figure 3 is a rear view of my tread and flange reducer;

Figure 4 is a side elevational view of my tread and flange reducer with the tool in position;

Figure 5 is a view of the tool;

Figure 6 is a view of the tread rider; and

Figure 7 is a view of the spacer.

Referring now to the drawings in detail, the undercarriage of the locomotive is provided with a brake-shoe hanger 11. Mounted on the hanger 11 is a bearing 12 which supports the end 13 of the brake beam. The brake head 14 is mounted on a trunnion. The brake head 14 has a passage 16 adapted to receive a brake shoe key 17 that secures the brake shoe to the head 14.

The brake shoe is removed by removing the brake shoe key 17 and my tread and flange reducer is attached to the brake head in place of the brake shoe. My tread and flange reducer 18 has a front face which has a flat portion 19 at one end. In the center, which is relatively thick, there is a hollowed-out portion 20 defining a cavity which serves to reduce the overall weight of my flange reducer. Near the lower end, there is a widened portion having a transverse slot 21 which receives the slidably cutting tool 22. Immediately above the slot 21 is a passage 23 adapted to receive a bolt 29 to secure the key-lug 24 to the back of the flange reducer. The key-lug 24 has a longitudinal passage 25 adapted to receive a wedge whereby the flange reducer is anchored to the brake head by the brake shoe key 17. The position of the passage 25 is adjustable in the passage 28 by loosening the lug 24 of the bolt 29. The end of the key-lug 27 enters a passage 28 and is held in that passage by the bolt 29. Adjacent to the position of the key-lug 24 on the back of the tread and flange reducer, there are pairs of raised ribs 30, 30 that may engage the sides of the brake head and help to maintain the alignment of the flange reducer with respect to the locomotive wheel. At the upper end of the flange reducer 18 on the rear thereof there is another pair of raised portions 31, 31, these portions 31, 31 embrace the brake head to insure alignment of the reducer 18. Commencing at the lower edge of these raised portions 31, 31 and extending downwardly therefrom, there is a channel 32. A spacer 33 is positioned over this channel. The rear of the spacer has a rib 34 which is in coincidence with the channel 32. This spacer 33, or another spacer of differing dimensions that may be substituted, serves to make the reducer 18 adaptable to all sizes of brake heads. In some cases, the spacer 33 is unnecessary and may be dispensed with. The front of the spacer has a pair of longitudinal ribs 35, 35 which correspond with the raised portions 31 of the flange reducer, they engage the brake head 14. Similar spacers 33 of varying dimensions may be supplied and interchangeable to accommodate varying dimensions of the brake head. A transverse passage 37 in the spacer 33 receives a bolt 38 by which the spacer is secured to the flange reducer 18. Tread riders 36 are also provided. The tread rider 36 is intruded between the tire tread and the reducer 18 to adjust the cutting position of the cutting tool 22, as shown in Figure 1.

The operation of my device is as follows:

The brake shoe is removed from the brake head by withdrawing the brake shoe key 17. The lug 24 is inserted in a passage in the brake head 14 and the brake shoe key 17 is introduced through the passage 16 to enter the passage 26 in the lug 24 and secure the flange reducer to the brake head 14. A tread rider 36, which is one of several of assorted dimensions, is inserted between the flat surface 19 and the tire tread to bring the face of the tread reducer 18 into such angular adjustment with respect to the tire tread as to dispose its face in substantial parallelism with the face of the tire tread. Then the cutting tool 22 is inserted in the slot with the surface 44, and when the brakes are applied, the locomotive is moved under its own power until the flat cutting surface has cut the flange down flat. Then the surface 40, the rough forming surface, is engaged with the flange 42.

Pressure of approximately 15 to 25 pounds is applied to the brake head and the locomotive is moved under its own power until the flange conforms to the surface 40. Pressure is released from the brake head. Then the cutting tool 22 is withdrawn and the face 41 is presented to the flange 42 to be reduced. This face is so designed as to cut the flange 42 to its final shape. In the event that the tread itself is afflicted with certain irregularities which should be modified, the flat surface 44 of the cutting tool 22 may be positioned in the slot 21 and the cutting tool moved in the slot 21 until it bears upon the said flat surface. By similar movement of the locomotive under similar circumstances as aforementioned, the inequalities in the tire tread surface may be removed.

Primarily, however, the present invention is designed for modifying the configuration of the flange to conform with accepted standards prescribed for efficient and safe operation.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. A tread and flange reducer comprising a tool holder adapted to press a tool to a flanged wheel with braking pressure, a concave face on the tool holder complementary to the flanged wheel whose tread or flange is to be reduced, a slot in the concave face on the tool holder disposed transversely to the peripheral contour of the flanged wheel whose tread or flange is to be reduced, a cutting tool slidably positioned in the slot, a convex face on the tool holder, a mounting means positioned on the convex face of the tool holder.

2. A tread and flange reducer comprising a tool holder adapted to press a tool to a flanged wheel with braking pressure, a concave face on the tool holder complementary to the flanged wheel whose tread or flange is to be reduced, a slot in the concave face on the tool holder disposed transversely to the peripheral contour of the flanged wheel whose tread or flange is to be reduced, a cutting tool slidably positioned in the slot, a convex face on the tool holder, a mounting means positioned on the convex face of the tool holder, flanges extending on both sides from both ends of the convex face of the tool holder.

3. A tread and flange reducer comprising a tool holder adapted to press a tool to a flanged wheel with braking pressure, a concave face on the tool holder complementary to the flanged wheel whose tread or flange is to be reduced, a slot in the concave face on the tool holder disposed transversely to the peripheral contour of the flanged wheel whose tread or flange is to be reduced, a cutting tool slidably positioned in the slot, a convex face on the tool holder, a mounting means positioned on the convex face of the tool holder, a flattened area adjacent one end of the concave face of the tool holder, and a tread rider positioned on said flattened area of the concave face.

4. A tread and flange reducer comprising a tool holder adapted to press a tool to a flanged wheel with braking pressure, a concave face on the tool holder complementary to the flanged wheel whose tread or flange is to be reduced, a slot in the concave face on the tool holder disposed transversely to the peripheral contour of the flanged wheel whose tread or flange is to be reduced, a cutting tool slidably positioned in the slot, a convex face on the tool holder, a mounting means positioned on the convex face of the tool holder, a spacer-member positioned on the convex face of the tool holder on the end opposite said slot.

5. A tread and flange reducer comprising a tool holder adapted to press a tool to a flanged wheel with braking pressure, a concave face on the tool holder complementary to the flanged wheel whose tread or flange is to be reduced, a slot in the concave face on the tool holder disposed transversely to the peripheral contour of the flanged wheel whose tread or flange is to be reduced, a cutting tool slidably positioned in the slot, a convex face on the tool holder, a mounting means positioned on the convex face of the tool holder, said means having a passage therein, a key engaged with the passage.

References Cited in the file of this patent

UNITED STATES PATENTS

| Number | Name | Date |
|---|---|---|
| 470,010 | Rhodes | Mar. 1, 1892 |
| 1,211,155 | Honea | Jan. 2, 1917 |
| 1,512,862 | Sayre | Oct. 21, 1924 |
| 1,637,330 | A'Hearn | Aug. 2, 1927 |
| 2,392,001 | Raper | Jan. 1, 1946 |